United States Patent
Grigsby et al.

(10) Patent No.: US 6,804,773 B1
(45) Date of Patent: Oct. 12, 2004

(54) SYSTEM AND METHOD FOR TRANSFERRING INFORMATION OVER A NETWORK

(75) Inventors: Steven A. Grigsby, Austin, TX (US); Kenneth W. Hester, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 792 days.

(21) Appl. No.: 09/678,641

(22) Filed: Oct. 3, 2000

(51) Int. Cl.⁷ .............................................. G06F 9/445
(52) U.S. Cl. .................. 713/1; 713/1; 713/2; 713/100; 709/201; 709/202; 709/203; 709/232; 709/245
(58) Field of Search ................ 713/1, 2, 100; 709/201–203, 232, 245

(56) References Cited

U.S. PATENT DOCUMENTS

| | | | | |
|---|---|---|---|---|
| 5,249,293 A | * | 9/1993 | Schreiber et al. ........... 709/203 |
| 5,388,267 A | | 2/1995 | Chan et al. | |
| 5,438,671 A | | 8/1995 | Miles | |
| 5,687,373 A | * | 11/1997 | Holmes et al. ............. 719/328 |
| 5,787,281 A | * | 7/1998 | Schreiber et al. ........... 719/328 |
| 5,887,172 A | * | 3/1999 | Vasudevan et al. ......... 719/328 |
| 5,926,636 A | * | 7/1999 | Lam et al. .................. 719/313 |
| 6,016,516 A | * | 1/2000 | Horikiri ..................... 719/330 |
| 6,167,462 A | * | 12/2000 | Davis et al. .................... 710/5 |
| 6,243,738 B1 | * | 6/2001 | Hayles et al. ............... 709/203 |
| 6,249,822 B1 | * | 6/2001 | Kays et al. ................. 719/330 |
| 6,339,783 B1 | * | 1/2002 | Horikiri ..................... 709/203 |
| 6,357,010 B1 | * | 3/2002 | Viets et al. ................. 713/201 |
| 6,594,757 B1 | * | 7/2003 | Martinez ....................... 713/2 |
| 6,631,424 B1 | * | 10/2003 | McDonough et al. ....... 719/330 |

* cited by examiner

*Primary Examiner*—Rehana Perveen
*Assistant Examiner*—Nitin C. Patel
(74) *Attorney, Agent, or Firm*—Haynes and Boone, LLP

(57) ABSTRACT

A method that includes receiving a function call from an administrator at a computer system is provided. The function call includes an argument. A function identified by the function call is executed in response to receiving the function call. Information is transferred from a location identified by the argument to the computer system in response to the function being executed.

15 Claims, 3 Drawing Sheets

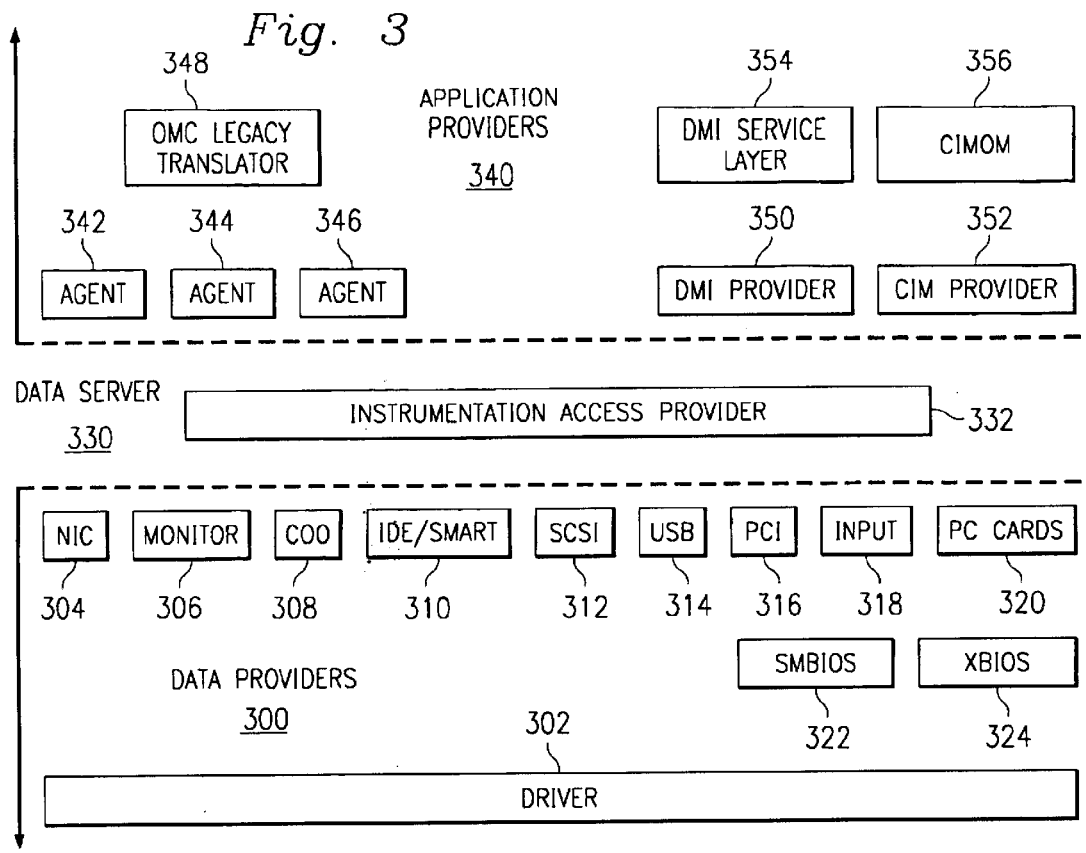
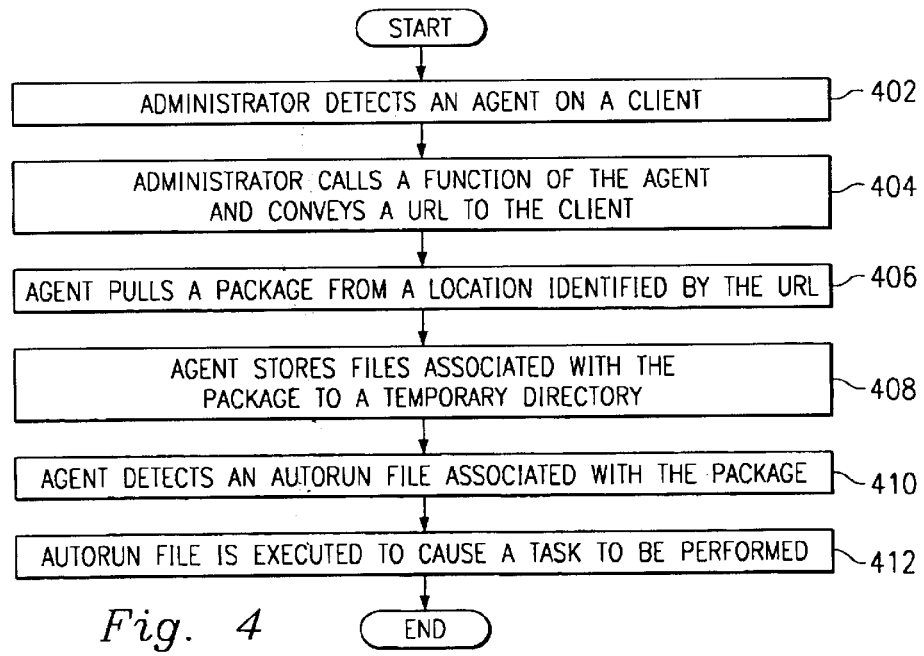

SYSTEM AND METHOD FOR TRANSFERRING INFORMATION OVER A NETWORK

BACKGROUND

The disclosures herein relate generally to computer systems and more particularly to transferring information over a network.

Administrators of computer systems and networks of computer systems often need to perform a task or tasks on one or more of the computer systems for which they are responsible. These tasks may include the transfer of information to and from a computer system. An administrator may need to perform the tasks on a large number of computer systems, and the computer systems may be located in different places. In addition, information needed to perform a task on a computer system may be located remotely from the computer system. As a result, an administrator may expend a significant amount of time to complete the tasks. It would be advantageous for an administrator at a remote location to be able to cause tasks to be performed on computer systems.

Therefore, what is needed is a system and method for allowing an administrator at a remote location to cause information to be transferred to and from a computer system.

SUMMARY

One embodiment, accordingly, provides a method that includes receiving a function call from an administrator at a computer system. The function call includes an argument. A function identified by the function call is executed in response to receiving the function call. Information is transferred from a location identified by the argument to the computer system in response to the function being executed.

A principal advantage of this embodiment is that it allows a remote administrator to cause a task to be performed on one or more computer systems. A remote administrator may call a function on a computer system that causes a task to be completed by the computer system.

BRIEF DESCRIPTION OF THE DRAWINGS

FIG. 3 is a diagram illustrating an embodiment of software objects on a computer system.

FIG. 4 is a flowchart illustrating an embodiment of a method for transferring information over a network.

DETAILED DESCRIPTION

Figure 1:
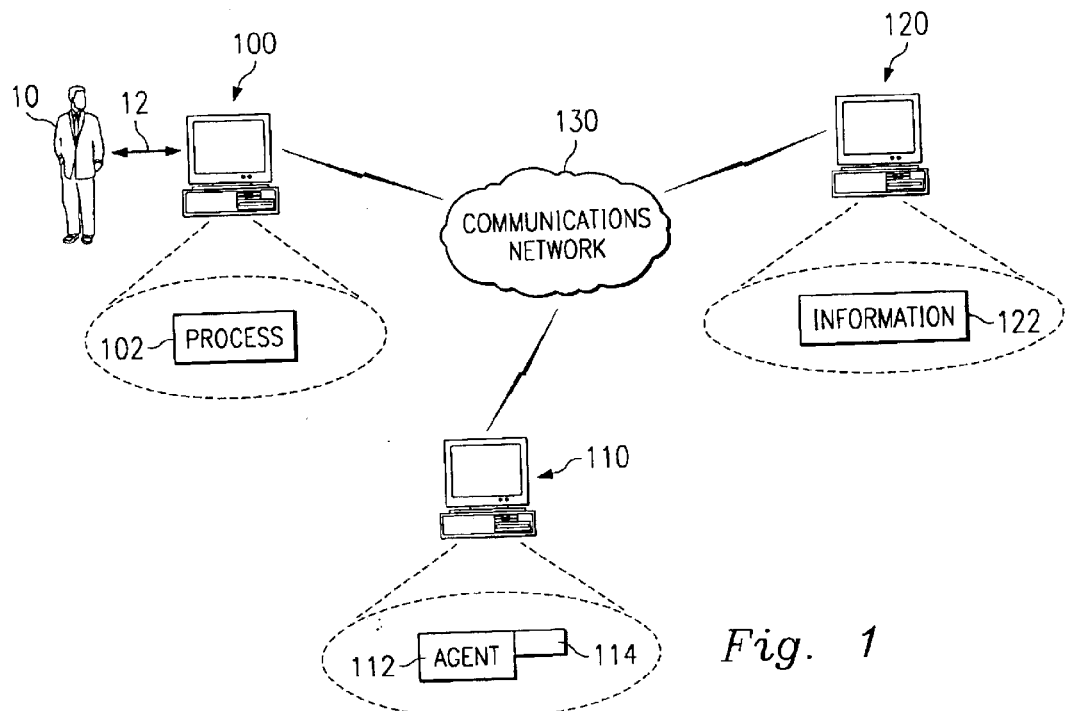
FIG. 1 is a diagram illustrating an embodiment of computer systems coupled to a communications network.

FIG. 1 is a diagram illustrating an embodiment of computer systems coupled to a communications network. A computer system 100, a computer system 110, and a computer system 120 are coupled to a communications network 130. Computer system 100 includes a process 102. Computer system 110 includes an agent 112 and an external interface 114 to agent 112. Computer system 120 includes information 122. Computer systems 100, 110, and 120 may each be any type of computing device configured to receive, process, and transfer information. Communications network 130 may be one or more of any type of network configured to convey information between computer systems 100, 110, and 120 such as a TCP/IP global communications network (the Internet), an intranet, or other form of hard-wired or wireless network.

Agent 112 is configured to provide a remote administrator 10 with the ability to cause tasks to be performed on computer system 110. These tasks include a remote BIOS (basic input/output system) update (RBU), data exportation, remote shutdown, and an Open Management Client Instrumentation (OMCI) update and will be described in more detail below.

Agent 112 exposes functions through interface 114. Process 102 detects interface 114 using communications network 130 and allows process 102 to call the functions exposed through interface 114. Process 102 provides information about these functions to administrator 10, and administrator 10, using process 102, causes one of these functions of agent 112 to be called as indicated by an arrow designated 12. In response to this action by administrator 10, a function call is conveyed to agent 112 on computer system 110 using communications network 130.

The functions provided by agent 112 include a function called DoAction. The DoAction function receives a Uniform Resource Locator (URL) or other location identifier as an argument. The URL identifies information that is to be obtained by the function DoAction. For example, a given URL may be http://server.company.com/packages/update.cab. The DoAction function may also receive other arguments such as the time to wait between retries, the number of times to retry, the account to use on a server specified by the URL (e.g., a login name and a password), and the cleanup enumeration.

The information, such as information 122 on computer system 120, may be located remotely from computer system 110. In response to receiving a function call for the DoAction function and a URL identifying information 122 from administrator 10, agent 112 causes information 122 to be pulled to computer system 110. Information 122 may be one or more files that have been combined into a package format such as a Microsoft Cabinet (CAB) file or a Zip form of package. Information 122 may be in a compressed format, may be digitally signed, and may be encrypted. Agent 112 may cause the package to be decompressed, may cause the signature to be verified, and may cause the transfer to be decrypted, as necessary.

If agent 122 is unsuccessful in downloading information 122, the download may be retried for a configurable number of times. If information 122 is not successfully downloaded within this number of tries, an event is sent to computer system 100 to notify administrator 10 that the task failed. In one embodiment, the event may be conveyed as a Distributed Management Interface (DMI) event. In other embodiments, the event may be conveyed in other ways.

In one embodiment, agent 112 is Component Object Module (COM) executable. In this embodiment, the built-in security mechanisms of COM are used to validate an administrator initiating an action. COM may leverage the existing security infrastructure of a Remote Procedure Call (RPC)

including authentication, access control, and token management. Access control may be set at deployment time to ensure that only domain administrators, for example, can invoke interface 114. COM provides multiple levels of authentication during the download. Accordingly, administrator 10 may choose the level of security and the transport mechanism used to download information 122 to a remote client. Any type of package may be downloaded to perform any type of task. In other embodiments, agent 112 may be a different type of program.

In one particular embodiment where computer system 110 operates using a Microsoft Windows operating system, agent 112 uses functions in the Microsoft WinInet Application Programming Interface (API) to connect to and download the information from a location identified by a URL. Agent 112 supports multiple transfer protocols such as File Transport Protocol (FTP) and HyperText Transport Protocol (HTTP) to download the information. In other embodiments, other operating systems and/or protocols may be used.

Figure 2:
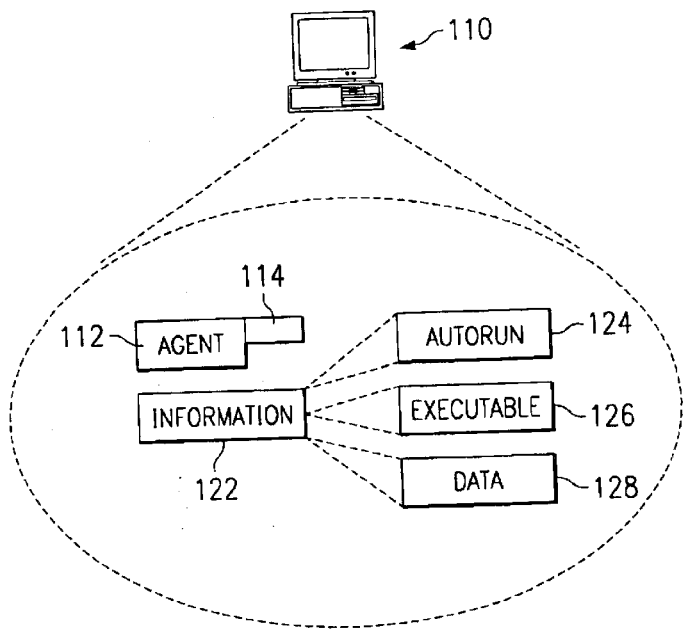
FIG. 2 is a diagram illustrating an embodiment of information on a computer system.

FIG. 2 is a diagram illustrating an embodiment of information on computer system 110. FIG. 2 illustrates the case where information 122 is a CAB file downloaded to computer system 110. As shown in FIG. 2, computer system 110 includes agent 112, interface 114, and information 122. Information 122 includes an autorun file 124, an executable file 126, and data 128.

In response to information 122 being downloaded to computer system 110, agent 122 causes the files in information 122 to be extracted into a temporary directory. Agent 122 then detects autorun file 124 to determine how to use the other files extracted from information 122. Autorun file 124 may cause executable file 126 to be executed to accomplish a task. Executable file 126 may be used to accomplish any predetermined task on computer system 110. Some examples of tasks that may be performed include an RBU, data exportation, remote shutdown, and an OMCI update. Each of these tasks will now be described.

An RBU updates the BIOS on computer system 110. For this task, autorun file 124 initiates executable file 126, and data 128 includes a BIOS header file. Executable file 126 maps the header file into memory on computer system 110, uses a System Management BIOS (SMBIOS) token to set a CMOS bit, posts a message box to a user of computer system 110, and restarts computer system 110. By setting the CMOS bit, computer system 110 is informed to update its BIOS during rebooting. During the reboot, the BIOS of computer system 110 is flashed. Agent 122 notifies administrator 10 as to whether the RBU was successful. Agent 122 may check an SMBIOS RBU completion code after the BIOS is flashed to determine whether the RBU was successful. An RBU may be performed in conjunction with a user of computer system 110. A user may cause an RBU to be deferred, for example. An RBU is also described with reference to FIG. 5a discussed below.

Data exportation causes information stored on computer system 110 to be conveyed to another computer system such as computer system 100. Data exportation can be initiated on demand or configured for automatic triggering at predefined intervals. Where automatic triggering is used, the additional settings for the intervals and times to do the export may be included in autorun file 124. For this task, autorun file 124 initiates executable file 126, and data 128 includes a template file that contains the settings for the data export. The template file may also include the class names of the groups to be exported. Executable file 126 causes the information to be collected and conveyed to another computer system such as computer system 100. Data exportation is also described with reference to FIG. 5a discussed below.

An administrator may cause computer system 110 to be shutdown by performing a remote shutdown. For this task, autorun file 124 initiates executable file 126. Executable file 126 notifies a user of computer system 110 that a shutdown is being requested and shuts down computer system 110. Executable file 126 may allow a user of computer system 110 to delay, defer, or cancel shutting down computer system 110. Remote shutdown is also described with reference to FIG. 5c discussed below. Other tasks such as resetting computer system 110, enabling or disabling a feature or component of computer system 110, e.g. a keyboard or a mouse, or enabling or disabling a power or reset button on computer system 110 may be performed in a manner analogous to performing a remote shutdown.

An OMCI update may involve updating information in one or more files associated with OMCI. For this task, autorun file 124 initiates executable file 126, and data 128 includes information used to update the OMCI. Executable file 126 updates the OMCI on computer system 110 using the information in data 128. The task of updating information is also described with reference to FIG. 5d discussed below. Other information on computer system 110 may be updated in a manner analogous to performing an OMCI update.

After a task performed by information 122 completes or fails to complete, agent 122 causes process 112 to be notified of the success or failure of the task. Administrator 10 receives this information and, where a task fails, may re-initiate the task.

FIG. 3 is a diagram illustrating an embodiment of software objects on a computer system. In FIG. 3, data providers 300, a data server 330, and application providers 340 are shown. Data providers 300 include a driver layer 302, an NIC object 304, a monitor object 306, a COO object 308, an IDE/Smart object 310, an SCSI object 312, a USB object 314, a PCI object 316, an input object 318, PC card objects 320, an SMBIOS (System Management BIOS) object 322, and an XBIOS object 324. Data server 330 includes an instrumentation access provider 332. Application providers 340 include an agent 342, an agent 344, an agent 346, an OMC legacy translator object 348, a DMI (Distributed Management Interface) provider object 350, a CIM (Common Information Model) provider object 352, a DMI (Distributed Management Interface) service layer object 354, and a CIMOM (Common Information Model Object Manager) object 356.

In one embodiment of FIG. 3, agent 342 is an action agent configured to perform the tasks described above including RBU, data exportation, remote shutdown, and OMCI update. Agent 344 is a data export agent configured to handle requests for exporting data to files. Agent 346 is a polling agent configured to handle the polling of probes and to perform actions based on the status of the probe. Agent 342 may use one or more functions in each of agents 344 and 346 to perform a task. In this embodiment, agents 342, 344, and 346 are Component Object Module (COM) executables. In other embodiments, agents 342, 344, and 346 may be configured to perform other functions.

FIG. 4 is a flowchart illustrating an embodiment of a method for transferring information over a network. An administrator detects an agent on a client as indicated in step 402. The administrator calls a function of the agent and conveys a uniform resource locator (URL) to the client as indicated in step 404. The agent pulls a package from a location identified by the URL as indicated in step 406. The agent stores files associated with the package to a temporary directory as indicated in step 408. The agent detects an autorun file associated with the package as indicated in step 410. The autorun file is executed to cause a task to be performed as indicated in step 412.

FIGS. 5a–5d illustrate tasks that may be performed using the method described above with reference to FIG. 4.

Figure 5A:
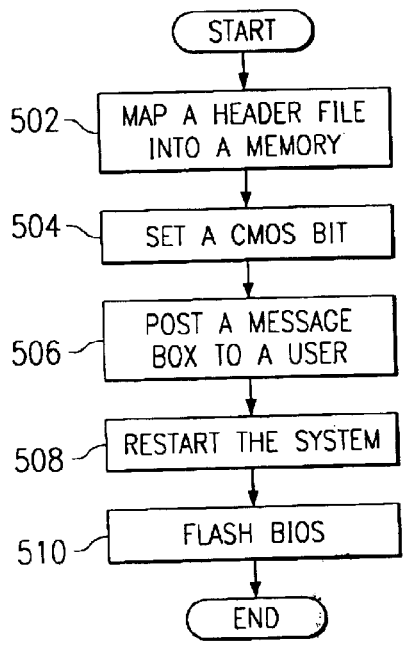
FIG. 5a is a flowchart illustrating an embodiment of a method for performing a task on a computing device.

FIG. 5a is a flowchart illustrating an embodiment of a method for performing a task on a computing device. A header file is mapped into a memory as indicated in step 502. A CMOS bit is set as indicated in step 504. A message box is posted to a user as indicated in step 506. The system is restarted as indicated in step 508. The BIOS is flashed as indicated in step 510.

Figure 5B:
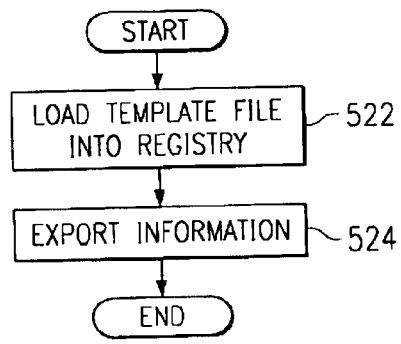
FIG. 5b is a flowchart illustrating an embodiment of a method for performing a task on a computing device.

FIG. 5b is a flowchart illustrating an embodiment of a method for performing a task on a computing device. A template file is loaded into a registry as indicated in step 522. Information is exported to another computer system as indicated in step 524.

Figure 5C:
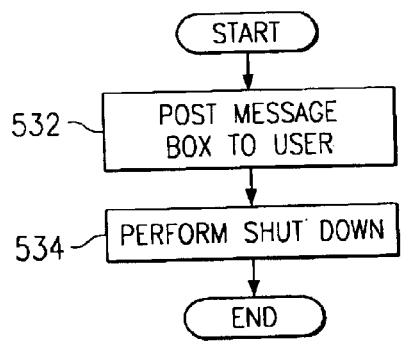
FIG. 5c is a flowchart illustrating an embodiment of a method for performing a task on a computing device.

FIG. 5c is a flowchart illustrating an embodiment of a method for performing a task on a computing device. A message box is posted to a user as indicated in step 532. A shut down is performed as indicated in step 534.

Figure 5D:
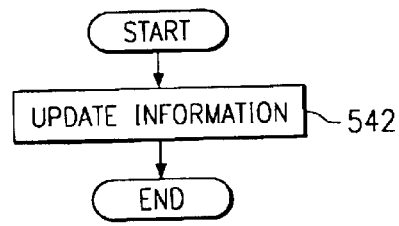
FIG. 5d is a flowchart illustrating an embodiment of a method for performing a task on a computing device.

FIG. 5d is a flowchart illustrating an embodiment of a method for performing a task on a computing device. Information is updated as indicated in step 542.

As can be seen, the principal advantages of these embodiments are that they allow a remote administrator to cause a task to be performed on one or more computer systems. A remote administrator may call a function on a computer system that causes a task to be completed by the computer system. The administrator may also automate the process to perform multiple tasks on multiple computers automatically. The embodiments may allow tasks to be performed on a large number of computer systems in an efficient manner.

Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. A method for transferring information over a network comprising:

an administrator detecting an agent on a client device;

the administrator calling a function of the agent and conveying a uniform resource locator (URL) to the client device;

the agent pulling a package from a location identified by the URL;

the agent storing files associated with the package to a temporary directory;

the agent detecting an autorun file associated with the package; and executing the autorun file to cause a task to be performed.

2. The method of claim 1, further comprising:

the task being performed by the computer system.

3. The method of claim 1, further comprising:

the task including updating a BIOS of the computer system.

4. The method of claim 1, further comprising:

the task including causing data to be conveyed from the computer system to the administrator.

5. The method of claim 1, further comprising:

the task including shutting down the computer system.

6. The method of claim 1, further comprising:

the agent including an external interface that can be remotely invoked using a component object model (COM) server.

7. The method of claim 6 further comprising:

using a remote procedure call (RPC) as a transport mechanism for COM.

8. The method of claim 1, further comprising:

causing the information to be transferred from a remote location to the computer system, the information including a program configured to cause the task to be performed by the computer system.

9. A system for transferring information over a network comprising:

a computing device for causing:

an administrator to detect an agent on a client device;

the administrator to call a function of the agent and convey a uniform resource locator (URL) to the client device;

the agent to pull a package from a location identified by the URL;

the agent to store files associated with the package to a temporary directory;

the agent to detect an autorun file associated with the package; and the autorun file to be executed to cause a task to be performed.

10. The system of claim 9, wherein the task includes updating a BIOS of the computing device.

11. The system of claim 9, wherein the task includes causing data to be conveyed from the computing device to the administrator.

12. The system of claim 9, wherein the task includes shutting down the computing device.

13. The system of claim 9, wherein the agent includes an external interface that can be remotely invoked using a component object module (COM).

14. The system of claim 13, further comprising:

using a remote procedure call (RPC) as a transport mechanism for the COM.

15. The system of claim 9, wherein the computing device is for:

causing the information to be transferred from a remote location to the computer device, the information including a program configured to cause the task to be performed by the computing device.

\* \* \* \* \*